United States Patent
Su et al.

(10) Patent No.: US 7,888,822 B2
(45) Date of Patent: Feb. 15, 2011

(54) POWER-SAVING LASER POINTER MOUSE

(75) Inventors: Chun-Nan Su, Taipei (TW);
Hung-Ming Lin, Taipei (TW);
Yi-Guang Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 211 days.

(21) Appl. No.: 12/260,369

(22) Filed: Oct. 29, 2008

(65) Prior Publication Data
US 2009/0219965 A1 Sep. 3, 2009

(30) Foreign Application Priority Data
Feb. 29, 2008 (TW) .............................. 97106978 A

(51) Int. Cl.
*H01H 47/00* (2006.01)
*G05F 5/00* (2006.01)
(52) U.S. Cl. ...................................... 307/130; 323/299
(58) Field of Classification Search ............... 307/130, 307/126, 125, 115; 323/299
See application file for complete search history.

(56) References Cited

U.S. PATENT DOCUMENTS

| 7,196,482 | B2* | 3/2007 | Krieger et al. | 315/291 |
| 7,420,353 | B2* | 9/2008 | Harmon et al. | 322/28 |
| 2006/0066568 | A1* | 3/2006 | Cheah et al. | 345/156 |

* cited by examiner

*Primary Examiner*—Michael Rutland Wallis
(74) *Attorney, Agent, or Firm*—Kirton & McConkie; Evan R. Witt

(57) ABSTRACT

The present invention provides a power-saving laser pointer mouse including a battery, a micro-controller and a laser diode. The power-saving laser pointer mouse can be operated in multi-stage power-saving modes according to the voltage value of the battery. The lighting time interval of the laser diode is adjusted by the micro-controller according to the voltage value of the battery. When the voltage value of the battery is reduced, the lighting time interval of the laser diode is shortened so as to achieve the power-saving purpose.

3 Claims, 2 Drawing Sheets ated into a digital voltage value. According to different digital voltage values, the duty cycles of the switching signals are correspondingly varied. That is, the laser pointer mouse of the present invention provides multi-stage power-saving modes according to the battery voltages. For example, on the condition that the analog voltage value of the battery 201 is decreased, the duty cycle of the switching signal is reduced under control of the micro-controller 202, thereby saving the electrical power.

POWER-SAVING LASER POINTER MOUSE

FIELD OF THE INVENTION

The present invention relates to a laser pointer mouse, and more particularly to a power-saving laser pointer mouse.

BACKGROUND OF THE INVENTION

With popularity of multimedia presentation and increased ease of editing, the lecturers or the presenters may directly display information in the form of a slide show in a meeting by incorporating a presentation program (e.g. PowerPoint) to edit and play slide files. For facilitating the audience well realize the presentation contents, a laser pointer is commonly used to project a point of light to highlight items of interest during a presentation.

Nowadays, with increasing awareness of environmental protection, more and more products are designed in views of power-saving concepts. For example, a power-saving device entitled "Power-saving device for visible light laser diode" is disclosed in Taiwanese Patent No. 325937, and the contents of which are hereby incorporated by reference. For achieving the power-saving purpose, based on persistence of vision and photoelectric properties of the laser diode, the visible light laser diode intermittently emits light under the circumstance imperceptible to the human beings.

FIG. 1A is a schematic timing waveform diagram illustrating a signal period T of a switching signal 101 for controlling illumination of a laser diode according to the background of Taiwanese Patent No. 325937. FIG. 1B is a schematic timing waveform diagram illustrating a signal period T of a switching signal 102 for controlling illumination of a laser diode according to a preferred embodiment of Taiwanese Patent No. 325937.

As shown in FIG. 1A, each signal period T of a switching signal 101 includes an on duration Ton and an off duration Toff, wherein the on duration Ton is equal to an off duration Toff. The switching signal 101 is maintained at a high level during the on duration Ton but maintained at a low level during the off duration Toff. In response to the switching signal 101 at the high level, the laser diode (not shown) emits light beams. Whereas, in response to the switching signal 101 at the low level, the illumination is interrupted.

The switching signal 102 of FIG. 1B is used for improving intermittent illumination according to a preferred embodiment of Taiwanese Patent No. 325937. The switching signal 102 of FIG. 1B is distinguished from the switching signal 101 of FIG. 1A in that there are several alternate high and low levels during the on duration Ton. Similarly, the laser diode of FIG. 1B emits light beams in response to the switching signal 102 at the high level in order to reduce the lighting time intervals and achieve the power-saving purpose.

Although the power-saving device utilizing the switching signal of FIG. 1B can achieve the power-saving purpose, there are still some drawbacks. For example, if the time intervals of the high levels of the switching signal 102 are too short, the laser light beams twinkle and appear dim and obscure. On the other hand, for achieving optimal brightness of laser light beams, the use of the switching signal 101 is more feasible but the power consumption is increased.

Therefore, there is a need of providing a power-saving laser pointer mouse with enhanced power-saving efficiency and desired brightness of laser light beams.

SUMMARY OF THE INVENTION

It is an object of the present invention to provide a power-saving laser pointer mouse with enhanced power-saving efficiency and desired brightness of laser light beams.

Another object of the present invention provides a power-saving laser pointer mouse for offering multi-stage power-saving modes according to the battery voltages.

In accordance with a first aspect of the present invention, there is provided a power-saving laser pointer mouse. The power-saving laser pointer mouse includes a battery, a micro-controller and a laser diode. The battery is used as a voltage source. The micro-controller is electrically connected to the battery for detecting a voltage value of the battery and outputting a switching signal, wherein a duty cycle of the switching signal is determined according to the voltage value. The laser diode is electrically connected to the micro-controller for emitting a light beam in response to the switching signal.

In an embodiment, the voltage value is an analog voltage value, which is converted by the micro-controller into a digital voltage value. More especially, the duty cycle of the switching signal is determined according to the digital voltage value.

In an embodiment, the duty cycle of the switching signal is reduced under control of the micro-controller if the analog voltage value is decreased.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
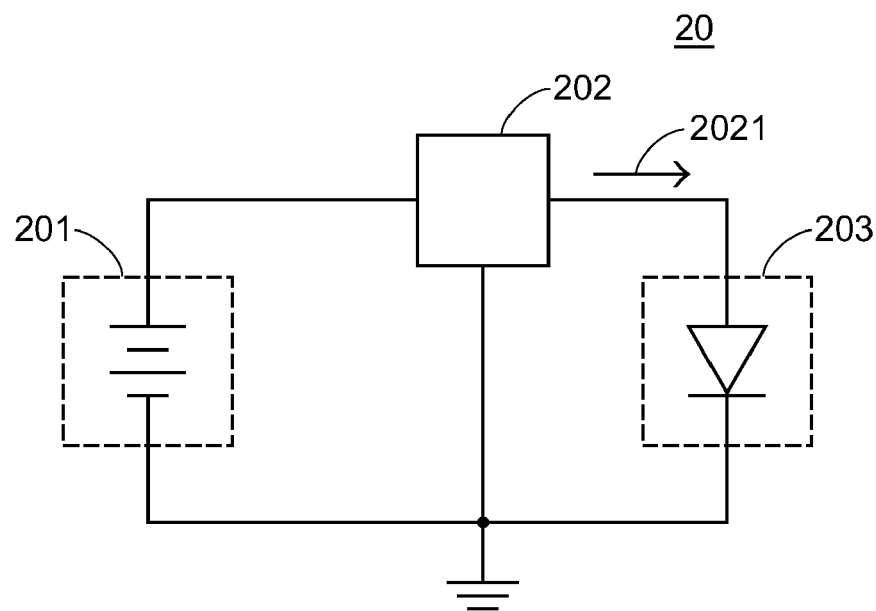
FIG. 2 is a schematic circuitry diagram illustrating an interior laser pointer circuit of a power-saving laser pointer mouse according to a preferred embodiment of the present invention.

FIG. 2 is a schematic circuitry diagram illustrating an interior laser pointer circuit of a power-saving laser pointer mouse according to a preferred embodiment of the present invention. The connecting manners between the interior laser pointer circuit and other components of the mouse are known in the art, and are not redundantly described herein.

As shown in FIG. 2, the laser pointer circuit 20 principally comprises a battery 201, a micro-controller 202 and a laser diode 203. The micro-controller 202 is electrically connected to the battery 201. The laser diode 203 is electrically connected to the micro-controller 202.

When a switch (not shown) of the laser pointer circuit 20 is turned on, the voltage value across the battery 201 is detected by the micro-controller 202 and a switching signal 2021 is issued. The voltage value across the battery 201 is an analog voltage value, which is converted by the micro-controller 202 into a digital voltage value. According to the digital voltage value, a duty cycle of the digital voltage value is determined. The principle of determining the digital voltage value will be described later. When the switching signal 2021 is received by the laser diode 203, the laser diode 203 emits a light beam. In response to alternating high and low levels of the switching signal 2021, intermittent illumination of the laser diode 203 is rendered. Due to persistence of vision for the human's eyes, the audience feels continuous illumination even if the laser diode 203 intermittently emits light in practice. Since the power of the battery is mostly consumed when the laser diode 203 emits light, the laser pointer circuit 20 can reduce the lighting time intervals of the laser diode 203 and achieve the power-saving purpose.

Figure 1A:
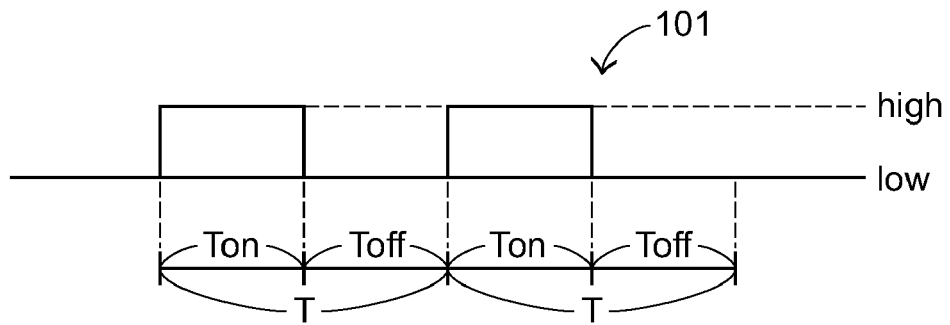
FIG. 1A is a schematic timing waveform diagram illustrating a signal period T of a switching signal 101 for controlling illumination of a laser diode according to the background of Taiwanese Patent No. 325937.
Figure 1B:
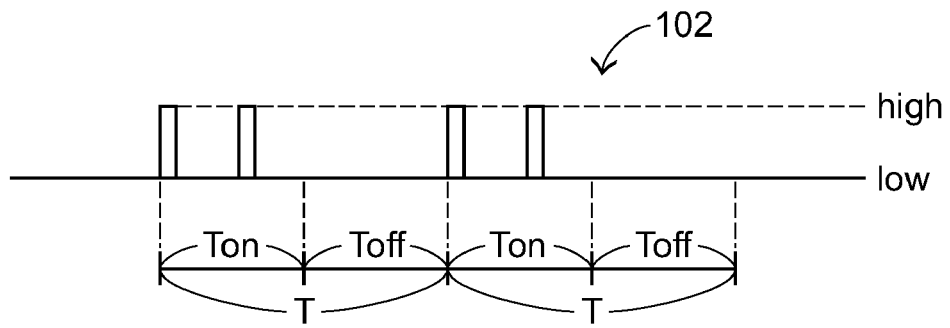
FIG. 1B is a schematic timing waveform diagram illustrating a signal period T of a switching signal 102 for controlling illumination of a laser diode according to a preferred embodiment of Taiwanese Patent No. 325937.
Figure 3:
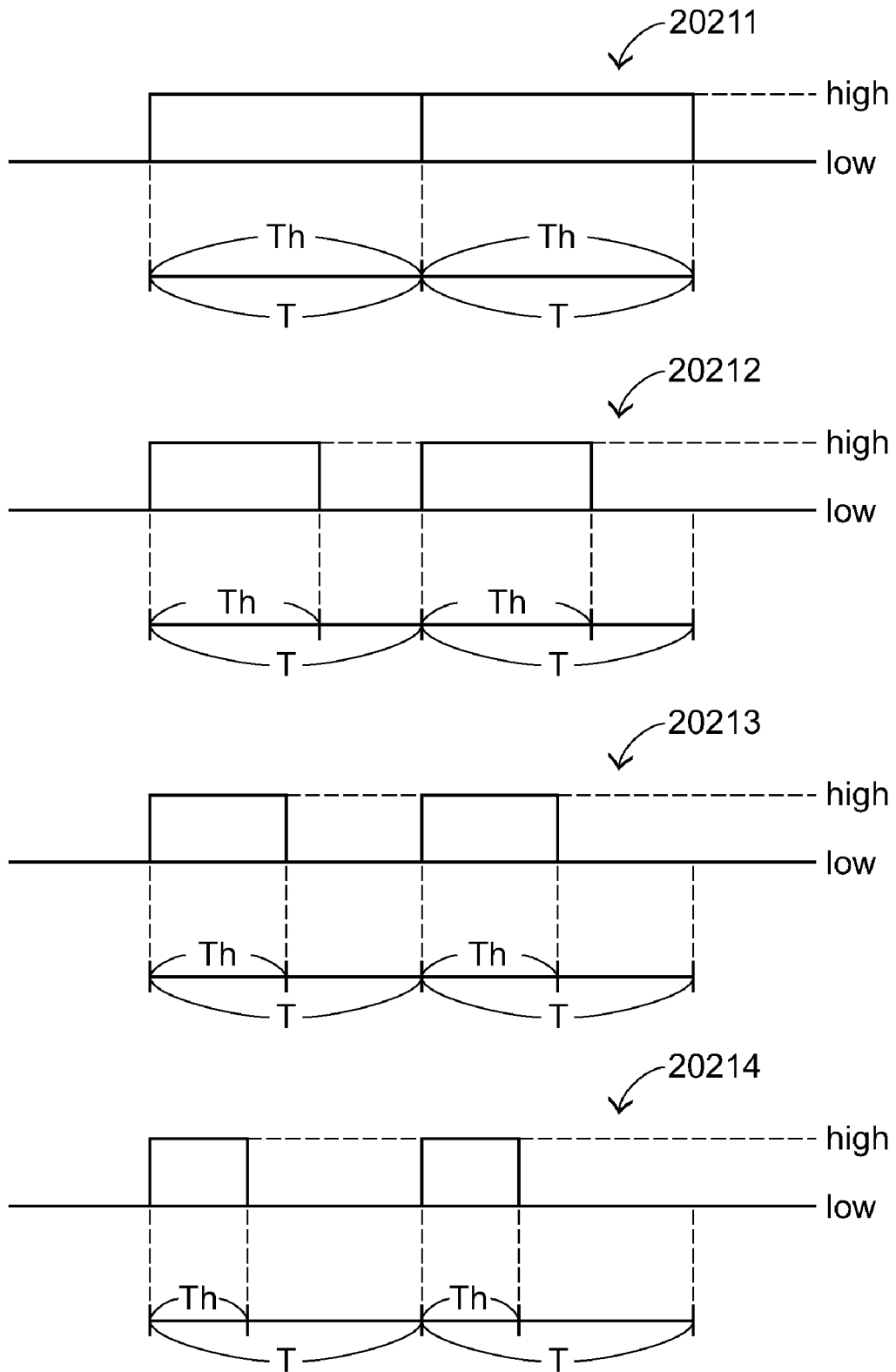
FIG. 3 schematically illustrates some examples of switching signals with different duty cycles.

FIG. 3 schematically illustrates some examples of switching signals with different duty cycles. Please refer to FIGS. 1, 2 and 3. In this embodiment, the micro-controller 202 detects the voltage value of the battery 201 and thus outputs a switching signal 2021 with a corresponding duty cycle. In the context, the term "duty cycle" used herein indicates the proportion of high-level duration Th for each signal period T of the switching signal 2021. For example, since the first switching signal 20211 are continuously maintained at the high-level state, the duty cycle of the first switching signal 20211 is 100%. In addition, the proportion of high-level duration Th is half of the signal period T of the third switching signal 20213, so that the duty cycle of the third switching signal 20213 is 50%.

In accordance with a key feature of the present invention, the duty cycles of the switching signal 2021 are varied according to the voltage values of the battery 201 detected by the micro-controller 202. That is, by receiving the switching signal 2021 of different duty cycles, the lighting time intervals of the laser diode 203 correlating to the high-level duration Th are adjustable. As a consequence, the laser pointer circuit can be operated in multi-stage power-saving modes.

Take a laser pointer circuit 20 having four-stage power-saving modes for example. In the first power-saving mode of the laser pointer circuit 20, if the voltage value of the battery 201 detected by the micro-controller 202 is ranged from 1.5V (e.g. an initial voltage) to 1.2V, the first switching signal 20211 having a duty cycle of 100% (i.e. the proportion of illumination for the laser diode 203 in each signal period T is 100%) is outputted from the micro-controller 202. In the second power-saving mode of the laser pointer circuit 20, if the voltage value of the battery 201 detected by the micro-controller 202 is ranged from 1.2V to 1.1V, the second switching signal 20212 having a duty cycle of 67% (i.e. the proportion of illumination for the laser diode 203 in each signal period T is 67%) is outputted from the micro-controller 202. In the third power-saving mode of the laser pointer circuit 20, if the voltage value of the battery 201 detected by the micro-controller 202 is ranged from 1.1V to 1.0V, the third switching signal 20213 having a duty cycle of 50% (i.e. the proportion of illumination for the laser diode 203 in each signal period T is 50%) is outputted from the micro-controller 202. In the fourth power-saving mode of the laser pointer circuit 20, if the voltage value of the battery 201 detected by the micro-controller 202 is smaller than 1.0V, the fourth switching signal 20214 having a duty cycle of 33% (i.e. the proportion of illumination for the laser diode 203 in each signal period T is 33%) is outputted from the micro-controller 202.

From the above description, the power-saving laser pointer mouse of the present invention can be operated in multi-stage power-saving modes according to the voltage values of the battery. In a case that the battery capacity is sufficient, the laser diode continuously emits light of relatively higher brightness. Whereas, in a case that the battery capacity is successively reduced, the lighting time intervals of the laser diode 203 are gradually shortened under intermittent illumination of the laser diode 203. Therefore, the power-saving efficiency of the power-saving laser pointer mouse of the present invention is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power-saving laser pointer mouse operating in multi-stage power-saving modes comprising:
    a battery as a voltage source and having a battery capacity;
    a micro-controller electrically connected to said battery for detecting a plurality of voltage values of said battery and outputting a switching signal, wherein a duty cycle of said switching signal is determined and varied by said micro-controller according to said detected voltage value being within a first of a plurality of voltage value ranges, wherein as said battery capacity decreases and said detected voltage value is outside said first voltage value range and within a second voltage value range, then said micro-controller varies said duty cycle of said switching signal to a second duty cycle; and
    a laser diode electrically connected to said micro-controller for emitting a light beam in response to said switching signal, wherein said duty cycle of said switching signal represents a proportion of high-level duration laser diode illumination for a given signal period.

2. The power-saving laser pointer mouse according to claim 1 wherein said voltage value is an analog voltage value, which is converted by said micro-controller into a digital voltage value, wherein said duty cycle of said switching signal is determined according to said digital voltage value.

3. The power-saving laser pointer mouse according to claim 2 wherein said duty cycle of said switching signal is reduced under control of said micro-controller if said analog voltage value is decreased.

* * * * *